(12) United States Patent
Zeniya et al.

(10) Patent No.: US 12,030,131 B2
(45) Date of Patent: Jul. 9, 2024

(54) SPOT WELDED JOINT, VEHICLE FRAMEWORK COMPONENT PROVIDED WITH SPOT WELDED JOINT, AND METHOD OF MANUFACTURING SPOT WELDED JOINT

(71) Applicant: NIPPON STEEL CORPORATION, Tokyo (JP)

(72) Inventors: Tasuku Zeniya, Tokyo (JP); Satoshi Hirose, Tokyo (JP); Atsuo Koga, Tokyo (JP); Koichi Hamada, Tokyo (JP); Masanori Yasuyama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 831 days.

(21) Appl. No.: 17/058,563

(22) PCT Filed: May 24, 2019

(86) PCT No.: PCT/JP2019/020589
§ 371 (c)(1),
(2) Date: Nov. 24, 2020

(87) PCT Pub. No.: WO2019/230580
PCT Pub. Date: Dec. 5, 2019

(65) Prior Publication Data
US 2021/0205915 A1    Jul. 8, 2021

(30) Foreign Application Priority Data
May 31, 2018   (JP) ................................ 2018-105233

(51) Int. Cl.
*B23K 11/11*    (2006.01)
*B23K 11/24*    (2006.01)
(Continued)

(52) U.S. Cl.
CPC ............... *B23K 11/11* (2013.01); *B23K 11/24* (2013.01); *B23K 2101/006* (2018.08); *B23K 2103/04* (2018.08)

(58) Field of Classification Search
CPC ..... B23K 11/11; B23K 11/24; B23K 2103/04; B23K 2101/006
See application file for complete search history.

(56) References Cited

U.S. PATENT DOCUMENTS

2012/0319431 A1    12/2012   Bodin et al.
2015/0174702 A1    6/2015    Fujimoto et al.

FOREIGN PATENT DOCUMENTS

| CN | 104507628 A | 4/2015 |
|---|---|---|
| JP | 2006-142905 A | 6/2006 |

(Continued)

OTHER PUBLICATIONS

"Metallic materials-Tensile testing-Method of test at room temperature", JIS Z 2241: 2011, total of 37 pages.
(Continued)

*Primary Examiner* — Janie M Loeppke
*Assistant Examiner* — Theodore J Evangelista
(74) *Attorney, Agent, or Firm* — Birch, Stewart, Kolasch & Birch, LLP

(57) ABSTRACT

This spot welded joint includes a first steel sheet having tensile strength of 1100 MPa or higher and hard martensitic structure as main structure, a second steel sheet stacked on the first steel sheet, a nugget having diameter D at an interface between the first and second steel sheets and formed between the first and second steel sheets, and a hardness control region occupying, in a cross section of the first steel sheet in sheet thickness direction that passes a nugget center, a region that is the first steel sheet in sheet thickness direction and is from 0.5×D to 1.0×D from the (Continued)

nugget center in sheet surface direction and in which difference between maximum value and minimum value in hardness in the region is 80 HV or less, and the maximum hardness value in the region is lower than the maximum hardness value of the first steel sheet.

10 Claims, 5 Drawing Sheets

(51) Int. Cl.
    *B23K 101/00*     (2006.01)
    *B23K 103/04*     (2006.01)

(56) References Cited

FOREIGN PATENT DOCUMENTS

| | | | |
|---|---|---|---|
| JP | 2010-59451 A | | 3/2010 |
| JP | 2010059451 A | * | 3/2010 |
| JP | 5459750 B2 | | 4/2014 |
| JP | 2014-223669 A | | 12/2014 |
| JP | 2015-422 A | | 1/2015 |
| JP | 2015000422 A | * | 1/2015 |
| JP | 2015-93282 A | | 5/2015 |
| JP | 5894081 B2 | | 3/2016 |

OTHER PUBLICATIONS

"Specimen dimensions and procedure for cross tension testing resistance spot and embossed projection welded joints", JIS Z 3137: 1999, total of 8 pages.

\* cited by examiner

SPOT WELDED JOINT, VEHICLE FRAMEWORK COMPONENT PROVIDED WITH SPOT WELDED JOINT, AND METHOD OF MANUFACTURING SPOT WELDED JOINT

TECHNICAL FIELD OF THE INVENTION

The present disclosure relates to a spot welded joint, a vehicle framework component provided with a spot welded joint, and a manufacturing method of a spot welded joint.

The present application claims priority based on Japanese Patent Application No. 2018-105233 filed in Japan on May 31, 2018, the content of which is incorporated herein by reference.

RELATED ART

In structures configured by stacking a plurality of steel sheet members, resistance spot welding is widely performed on an overlapping portion where the steel sheet members are overlapped.

For example, Patent Document 1 describes an energy absorbing member in which a hat material and a closing plate are joined to each other by spot welding.

Currently, high-strength steel sheets having a tensile strength of 980 MPa or higher are widely used as high-strength steel sheets for vehicles. In recent years, high-strength steel sheets having a tensile strength of 1100 MPa or higher has begun to be applied. High-strength steel sheets having a tensile strength of 1100 MPa or higher generally include a quenched structure in order to obtain a high strength. When resistance spot welding is performed, a nugget that welds steel sheets is formed, and a heat affected zone (hereinafter referred to as HAZ) is generated in the periphery of the nugget. Ordinarily, HAZ includes a quenched structure. However, in a case where resistance spot welding is performed on a high-strength steel sheet having a quenched structure, a region (HAZ softened portion) having a lower hardness than the base metal having a quenched structure is formed. This is because the quenched structure of the base metal is tempered by heat from resistance spot welding.

Ordinarily, when there is a region having low hardness, strength decreases. However, the above-described HAZ softened portion does not have any influence on the evaluation results of a tensile shear test and a cross tension test (JIS Z 3137) that are used for the joint evaluation of resistance spot welding. However, in a case where in-plane tensile stress is applied, there is a case where strain locally concentrates in the HAZ softened portion and causes breaking in the HAZ softened portion.

In the event of a car collision, there is a need for protecting passengers in a cabin. Therefore, structural members (lap welded members) that configure vehicle bodies of vehicles, such as an A pillar, a B pillar, a roof rail, and a side sill need to have a high strength. Ordinarily, a structural member that configures a vehicle body of a vehicle is manufactured by stacking a plurality of steel sheet members and joining flanges (overlapping portions) by resistance spot welding to form a cylindrical closed cross section. In order to improve deformation resistance in the event of a collision and absorb a larger amount of collision energy with a small amount of deformation, a method such as the high-strengthening of a material (base metal) or an increase in the number of welding points (spots) is employed.

To a part of the flange of the above-described member that is subjected to resistance-spot-welding, there is a case where in-plane tensile stress is applied in the event of a collision. Even when the high-strengthening of the base metal is performed, and the number of welding points is increased, in a case where the above-described HAZ softened portion is generated, there is a case where collision-resistant performance that is assumed from the strength of the base metal and the shapes of components cannot be obtained.

Therefore, in a case where a steel sheet member made of a high-strength steel sheet is applied to a structural member for a vehicle body of a vehicle, there is a demand for suppressing a peripheral region of a nugget acting as a starting point of breaking.

In the related art, studies have been made to improve the characteristics of welded members formed by resistance spot welding. For example, Patent Document 2 describes, as a welded joint having improved characteristics in a spot-welding portion, a welded joint for which a heat treatment is performed on a spot-welding portion at 100° C. to 400° C., and the L-tensile joint strength is improved. In addition, Patent Document 3 describes a method in which post energization is performed on a spot-welding portion and a cross tensile joint strength is improved. Patent Document 4 describes a welding method in which, after welding, high-frequency induction heating is rapidly performed on a spot welding electrode having a coil that coils the periphery of the spot welding electrode to temper a spot-welding portion and a welded portion, thereby improving the joint strength that is evaluated from the ratio between TSS and the material strength and the product of CTS and the material strength.

However, the techniques disclosed in Patent Documents 2 to 4 are capable of obtaining a certain degree of effect in improving TSS or CTS, but do not take into account of breaking in HAZ softened portions when in-plane tensile stress is applied to steel sheets.

Regarding the above-described problem, Patent Document 5 describes a B pillar having an energy absorption capability enhanced by providing a region having a strength of lower than 1100 MPa, which is referred to as a soft zone, in part or all of a flange portion that is subjected to spot welding.

However, in the B pillar disclosed in Patent Document 5, since it is necessary to soften a side flange, there is a concern that the bending performance may degrade. In addition, in Patent Document 5, since the softened region is provided in the component before welding, there is another problem in that the shape accuracy of the component decreases. When the shape accuracy of the component decreases, a gap is generated between components during welding, which makes welding difficult.

PRIOR ART DOCUMENT

Patent Document

[Patent Document 1] Japanese Unexamined Patent Application, First Publication No. 2006-142905
[Patent Document 2] Japanese Unexamined Patent Application, First Publication No. 2010-059451
[Patent Document 3] Japanese Unexamined Patent Application, First Publication No. 2015-093282
[Patent Document 4] Japanese Patent No. 5459750
[Patent Document 5] Japanese Patent No. 5894081

DISCLOSURE OF THE INVENTION

Problems to be Solved by the Invention

The present disclosure has been made in view of the above-described problem, and an object of the present invention is to provide a spot welded joint capable of suppressing breaking from a region in the periphery of a nugget even in a case where in-plane tensile stress is applied, a vehicle framework component provided with the spot welded joint, and a manufacturing method of the spot welded joint.

Means for Solving the Problem

The present inventors performed investigation and examination regarding spot welded joints for high-strength steel sheets. As a result, it was found that breaking in a HAZ softened portion under the application of in-plane stress can be suppressed by controlling hardness in a predetermined region in the periphery of a nugget including the HAZ softened portion.

The HAZ softened portion having lower hardness than base metal is rarely formed in steel sheets having a tensile strength of lower than 980 MPa. The HAZ softened portion can be generated in steel sheets having a tensile strength of 980 MPa or higher. Particularly, the HAZ softened portion is significantly generated in high-strength steel sheets having a tensile strength of 1100 MPa or higher that are high-strengthened by a quenching treatment or in spot-welding portions of hot stamped materials (high-strength steel sheet members) formed by hot stamping.

The present disclosure has been made based on the above-described finding, and the gist thereof is as described below.

(1) A spot welded joint according to an aspect of the present disclosure includes a first steel sheet having a tensile strength of 1100 MPa or higher and having a hard martensitic structure as a main structure, a second steel sheet stacked on the first steel sheet, a nugget having a diameter D at an interface between the first steel sheet and the second steel sheet and formed between the first steel sheet and the second steel sheet, and a hardness control region that occupies, in a cross section of the first steel sheet in a sheet thickness direction that passes through a center of the nugget, a region that is the entire first steel sheet in the sheet thickness direction and is from 0.5×D to 1.0×D apart from the center of the nugget in a sheet surface direction and in which a difference between a maximum value of hardness and a minimum value of the hardness in the region is 80 HV or less, and the maximum value of the hardness in the region is lower than the maximum value of hardness of the first steel sheet.

(2) The spot welded joint according to (1) described above may further include another nugget in the cross section.

(3) In the spot welded joint according to (1) or (2) described above, the hardness control region may be present in all of the cross section.

(4) In the spot welded joint according to any one of (1) to (3) described above, the maximum value of the hardness in the region may be 250 HV to 450 HV.

(5) In the spot welded joint according to any one of (1) to (4) described above, the first steel sheet and the second steel sheet may be plated steel sheets.

(6) A vehicle framework component according to another aspect of the present disclosure includes the spot welded joint according to any one of (1) to (5) described above.

(7) A manufacturing method of a spot welded joint according to another aspect of the present disclosure including stacking a first steel sheet having a tensile strength of 1100 MPa or higher and having a hard martensitic structure as a main structure and a second steel sheet, performing resistance spot welding to form a nugget between the first steel sheet and the second steel sheet, the nugget having a diameter D at an interface between the first steel sheet and the second steel sheet present, and tempering an entire region that is, in a cross section of the first steel sheet in a sheet thickness direction that passes through a center of the nugget, the entire first steel sheet in the sheet thickness direction and is from 0.5×D to 1.0×D apart from the center of the nugget in a sheet surface direction.

(8) In the manufacturing method of a spot welded joint according to (7) described above, a tempering may be performed such that a difference between a maximum value of hardness and a minimum value of the hardness in the region becomes 80 HV or less and the maximum value of the hardness in the region becomes lower than a maximum value of hardness of the first steel sheet.

(9) In the manufacturing method of a spot welded joint according to (7) or (8) described above, the tempering may be performed on the region of all of the cross section.

(10) In the manufacturing method of a spot welded joint according to (8) or (9) described above, the maximum value of the hardness in the region may be 250 HV to 450 HV.

Effects of the Invention

According to the spot welded joint of the present disclosure, even in a case where in-plane tensile stress is applied, breaking from the HAZ softened portion in the vicinity of the nugget does not easily occur. Therefore, in the case of using the spot welded joint as a structural member that configures a vehicle body of a vehicle, it is possible to obtain high collision-resistant performance.

In addition, according to the vehicle framework component of the present disclosure, breaking from the HAZ softened portion does not easily occur. Therefore, it is possible to obtain high collision-resistant performance.

In addition, according to the manufacturing method of a spot welded joint of the present disclosure, it is possible to manufacture a spot welded joint capable of obtaining high collision-resistant performance in the case of using the spot welded joint as a structural member that configures a vehicle body of a vehicle.

EMBODIMENTS OF THE INVENTION

A spot welded joint according to an embodiment of the present disclosure (a spot welded joint according to the present embodiment), a vehicle framework component according to the present embodiment, and a manufacturing method of a spot welded joint according to the present embodiment will be described with reference to drawings.

First, the spot welded joint according to the present embodiment will be described.

Figure 1:
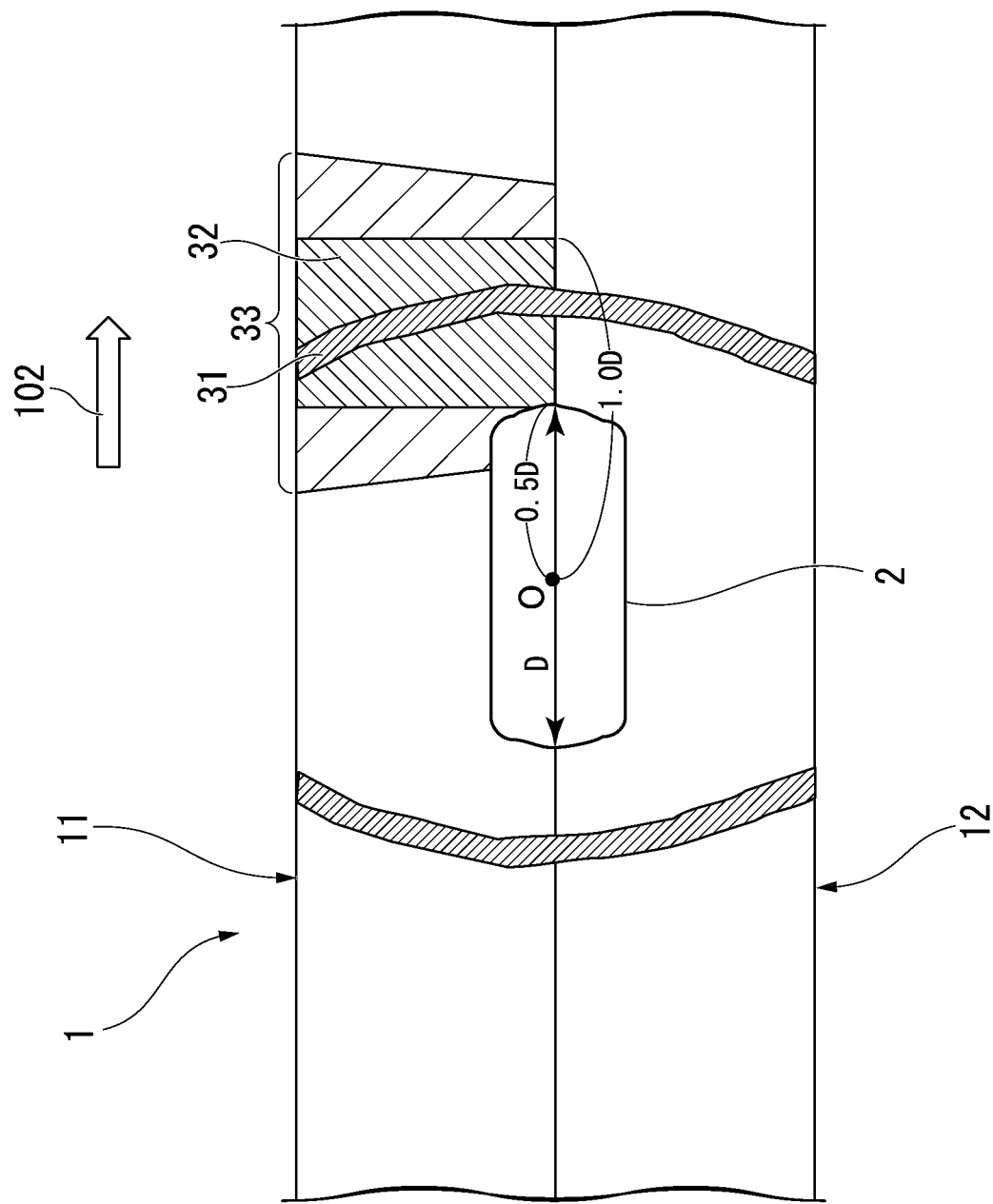
FIG. 1 is a cross-sectional view of a spot welded joint according to the present embodiment in a sheet thickness direction that passes through a nugget center.
Figure 2:
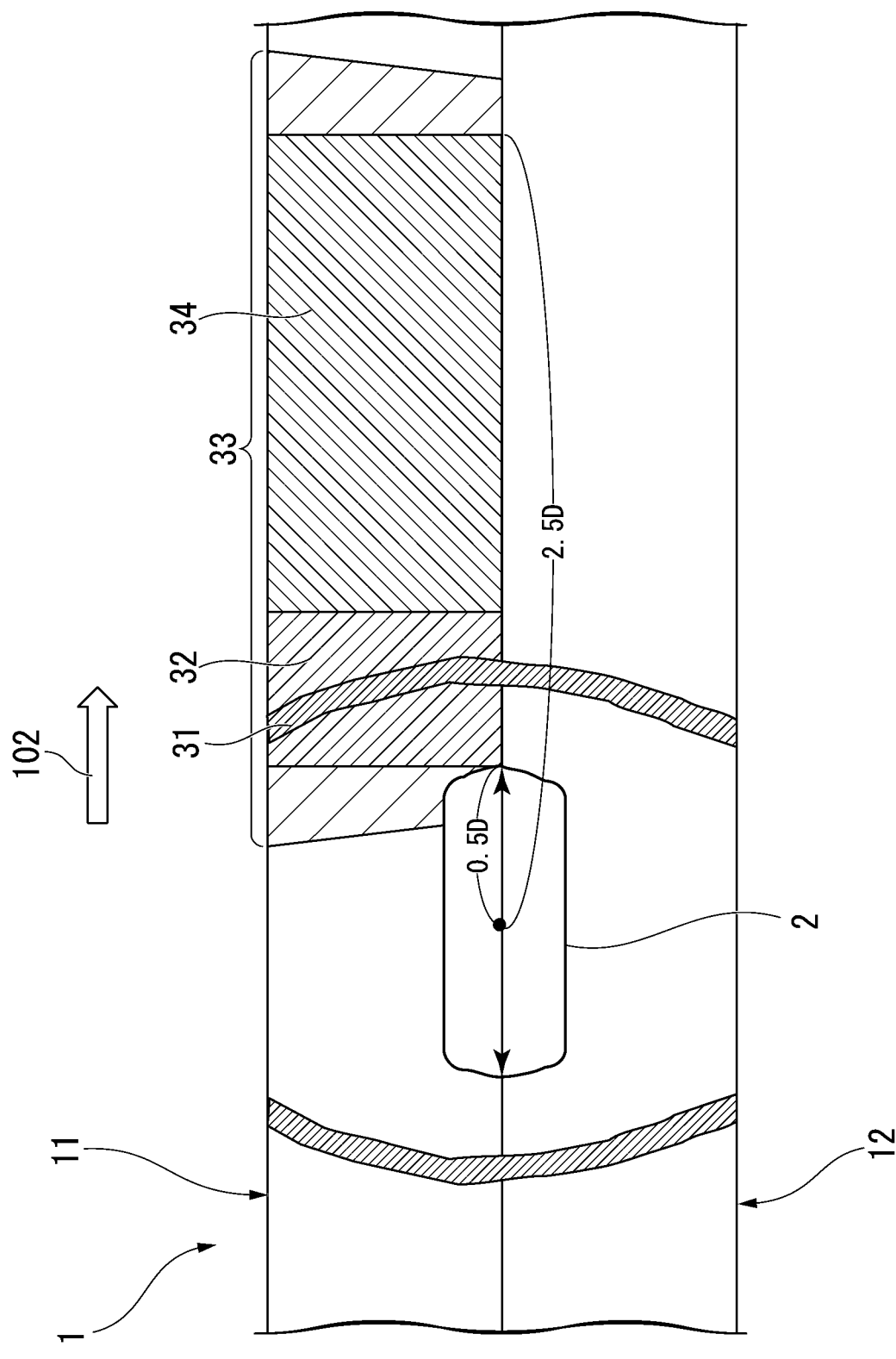
FIG. 2 is a cross-sectional view of the spot welded joint according to the present embodiment in the sheet thickness direction that passes through the nugget center.

As shown in FIG. 1 and FIG. 2, a spot welded joint 1 according to the present embodiment includes a first steel sheet 11, a second steel sheet 12 stacked on the first steel sheet 11, and a nugget 2 having a diameter D at the interface between the first steel sheet 11 and the second steel sheet 12 formed between the first steel sheet 11 and the second steel sheets 12. That is, the first steel sheet 11 and the second steel sheet 12 are joined with the nugget 2.

In addition, the spot welded joint 1 according to the present embodiment includes a hardness control region 33 that occupies a first region 32. The first region 32 is a region that is, in a cross section of the first steel sheet 11 in the sheet thickness direction that passes through the center O of the nugget 2, the first steel sheet 11 throughout the entire sheet thickness and is between a position 0.5×D apart from the center O of the nugget 2 and a position 1.0×D apart from the center O of the nugget 2 (hereinafter, referred to as the range of 0.5×D to 1.0×D in some cases) in a sheet surface direction (at least one direction of directions perpendicular to the sheet thickness direction of the first steel sheet 11, for example, a direction of an arrow 102 in FIG. 1).

In the present embodiment, the hardness control region 33 that occupies the first region 32 means that the hardness control region 33 includes the entire first region 32.

Ordinarily, a HAZ softened portion is formed in a region a predetermined distance apart from the nugget. In the spot welded joint 1 according to the present embodiment, the HAZ softened portion is generated in the range of 0.5×D to 1.0×D from the center O of the nugget in the sheet surface direction. Therefore, in the spot welded joint 1 according to the present embodiment, in order to suppress breaking from the periphery of the nugget 2, the hardness in the first region 32 is controlled as described below by performing a tempering treatment on the hardness control region 33.

For example, from the viewpoint of cross tensile strength or the like, there is a possibility that a joint strength improvement effect can be obtained by tempering only the vicinity of the interface between the first steel sheet and the second steel sheet. However, in order to prevent breaking from the HAZ softened portion in a case where in-plane tensile stress is applied, it is necessary to control the hardness by performing a tempering treatment on the first steel sheet 11 throughout the entire sheet thickness.

In addition, as described above, the present disclosure deals with a spot welded joint in which the HAZ softened portion is generated in the range of 0.5×D to 1.0×D as shown in FIG. 1. This is because breaking from the HAZ softened portion cannot be sufficiently prevented by controlling the hardness only in a range sandwiched between the nugget 2 and the HAZ softened portion, and, unless the hardness is controlled in a region covering from the nugget 2 to at least the HAZ softened portion, preferably, a region covering beyond the HAZ softened portion, it is not possible to prevent breaking from the HAZ softened portion in a case where in-plane tensile stress is applied.

In addition, in order to more reliably suppress breaking from the periphery of the nugget 2, it is desirable to control the hardness in a second region 34, in addition to the first region 32, in the same manner as the hardness in the first region 32 as shown in FIG. 2. The second region 34 is a region that is the first steel sheet 11 throughout the entire sheet thickness and is between the position 1.0×D apart and a position 2.5×D apart from the center O of the nugget 2 in the sheet surface direction (a range of 1.0×D to 2.5×D). The hardness control region shown in FIG. 2 includes the first region and the second region. That is, it is preferable to configure the hardness control region 33, on which tempering is performed, to occupy the first region 32 and the second region 34 as shown in FIG. 2 and then control the hardness in the first region 32 and the second region 34.

The hardness control region 33 shown in FIG. 1 and FIG. 2 may include a peripheral region adjacent to the first region 32 or the first region 32 and the second region 34. The peripheral region is a region affected by heat from tempering when the hardness is controlled by tempering the first region 32 or the first region 32 and the second region 34. That is, the peripheral region is a hardness transition portion which is present between a high hardness portion (base material portion) that is not affected by heat from tempering and the first region 32 or the second region 34.

In addition, in the first region 32 and the second region 34, the thickness in a direction perpendicular to the cross section (a direction perpendicular to the paper surface of FIG. 1 or FIG. 2) is desirably 0.75×D or more. More desirably, the thickness of the first region 32 and the second region 34 in the direction perpendicular to the cross section is more desirably D (1.0×D) or more. In such a case, since the positions of all of HAZ softened portions 31 where strain may concentrate are softened, breaking in the HAZ softened portions 31 is further suppressed, and it is possible to increase the elongation until breaking.

In the present embodiment, the diameter D of the nugget 2 is the length of the nugget 2 in the sheet surface direction at the interface between the first steel sheet 11 and the second steel sheet 12 in a cross section of the first steel sheet 11 in the sheet thickness direction that passes through the center O of the nugget 2.

The nugget 2 is obtained by stacking the first steel sheet 11 and the second steel sheet 12 and performing resistance spot welding.

The first steel sheet 11 is a steel sheet having a hard martensitic structure as the main structure and having a tensile strength of 1100 MPa or higher. This is because, in steel sheets having a tensile strength of lower than 1100 MPa, the HAZ softened portion 31 does not clearly appear and thus the problem that the invention deals with is not generated. Meanwhile, regarding the second steel sheet 12, there is no limitation.

As described above, high-strength steel sheets having a tensile strength of 1100 MPa or higher ordinarily have a structure in which a quenched structure such as hard martensite is dominant (at least 50 area % or more, for example, 80 area % or more). Such a structure is obtained by the transformation of the structure by quenching. In a case where a spot-welding is performed on a steel sheet having a quenched structure as the main structure, hard martensite is tempered in HAZ in the periphery of the nugget due to heat from resistance spot welding. That is, hard martensite changes into a soft structure such as tempered martensite, bainite, or ferrite. Therefore, a region having lower hardness than the base metal (HAZ softened portion 31) is generated. In a case where in-plane stress is applied, this HAZ softened portion 31 acts as a starting point of breaking.

The microstructural fraction of the hard martensite in the first steel sheet 11 can be confirmed by observing the structure at a position where welding heat has no influence with a microscope. Specifically, an etching treatment is performed using a LePera etchant on samples collected from five places in each at a ⅛ thickness position, a ⅜ thickness position, a ⅝ thickness position, and a ⅞ thickness position from the surface of the first steel sheet 11 in a cross section of the steel sheet in the sheet thickness direction, 100 μm×100 μm visual fields are observed with an optical microscope at a magnification of 1000 times, and the area fractions of martensite are measured in the observed visual fields with an assumption that a structure appearing white to reddish brown is regarded as martensite. The area fractions of martensite in the observed 20 visual fields are averaged, thereby obtaining the area fraction of martensite in the first steel sheet 11.

After that, an etching treatment is performed on the same samples using picral, 100 μm×100 μm visual fields are observed with the optical microscope at a magnification of 1000 times, and the proportions of hard martensite in martensite are obtained in the observed visual fields. Martensite containing carbide is determined as hard martensite, and martensite containing no carbide is determined as tempered martensite.

The proportions of hard martensite in martensite in 20 visual fields are obtained and averaged, and the average value is multiplied by the martensite area fraction of the first steel sheet 11 obtain above, whereby the microstructural fraction (area fraction) of hard martensite in the first steel sheet 11 can be obtained.

When the average of the area fractions of hard martensite is 50% or more, the hard martensitic structure is determined as the main structure.

In the spot welded joint 1 according to the present embodiment, the hardness in the first region 32 is controlled as described above. Specifically, the difference between the maximum value of the hardness and the minimum value of the hardness in the first region 32 is 80 HV or less. In addition, the maximum value of the hardness in the first region 32 is lower than the maximum value of the hardness of the first steel sheet 11.

More desirably, the difference between the maximum value of the hardness and the minimum value of the hardness is 80 HV or less in the first region 32 and the second region 34. In this case, the maximum hardness in the first region 32 and the maximum hardness in the second region 34 are preferably lower than the maximum hardness of the first steel sheet 11.

When the welded joint is configured as described above, breaking from the HAZ softened portion 31 is suppressed, and, even in a case where in-plane tensile stress is applied, the breaking occurs from the base metal. On the other hand, in a case where the difference (hardness difference) between the maximum value of the hardness and the minimum value of the hardness in the first region 32 exceeds 80 HV, since strain concentrates in the HAZ softened portion 31 when tensile stress (in-plane tensile stress) is applied from both sides of the first steel sheet, breaking occurs from the HAZ softened portion 31. The difference (hardness difference) between the maximum value and the minimum value of the hardness in the above-described first region 32 is preferably 50 HV or less. Furthermore, when the hardness in the second region is also controlled in the same manner, the concentration of stress in the HAZ softened portion is further alleviated.

In steel sheets having a hard martensitic structure as the main structure, the hardness of a portion affected by welding heat becomes lower than the hardness before welding. Therefore, as the maximum value of the hardness of the first steel sheet 11, hardness is measured at positions in the first steel sheet 11 that are not affected by heat from resistance spot welding, and the maximum value is used. Regarding the positions that are not affected by heat from resistance spot welding, for example, hardness may be measured at positions 15 mm or more apart from the nugget 2 in a direction in which there is no other nugget.

Specifically, hardness is measured using a Vickers hardness tester under a load set to 1.0 kgf at a ⅛ thickness position, a ⅜ thickness position, a ⅝ thickness position, and a ⅞ thickness position from the surface of the first steel sheet 11 in 10 places that are not affected by heat from resistance spot welding, and the maximum value is used.

The maximum value and the minimum value of the hardness in the first region 32 are measured using a Vickers hardness tester under a load set to 100 gf. Specifically, hardness is measured at intervals of 0.1 mm from one end portion to the other end portion of the first region 32 in a direction perpendicular to the sheet thickness direction (that is, the sheet surface direction) at the ⅛ thickness position, the ⅜ thickness position, the ⅝ thickness position, and the ⅞ thickness position from the surface of the first steel sheet 11 in a cross section of the first steel sheet 11 in the sheet thickness direction that includes the center O of the nugget. In addition, the maximum value and the minimum value of the measured hardness are regarded as the maximum value of the hardness and the minimum value of the hardness in the first region 32.

In the case of a vehicle framework component such as a B pillar, ordinarily, spot-welding portions are formed at a plurality of places in overlapped steel sheets.

Figure 3:
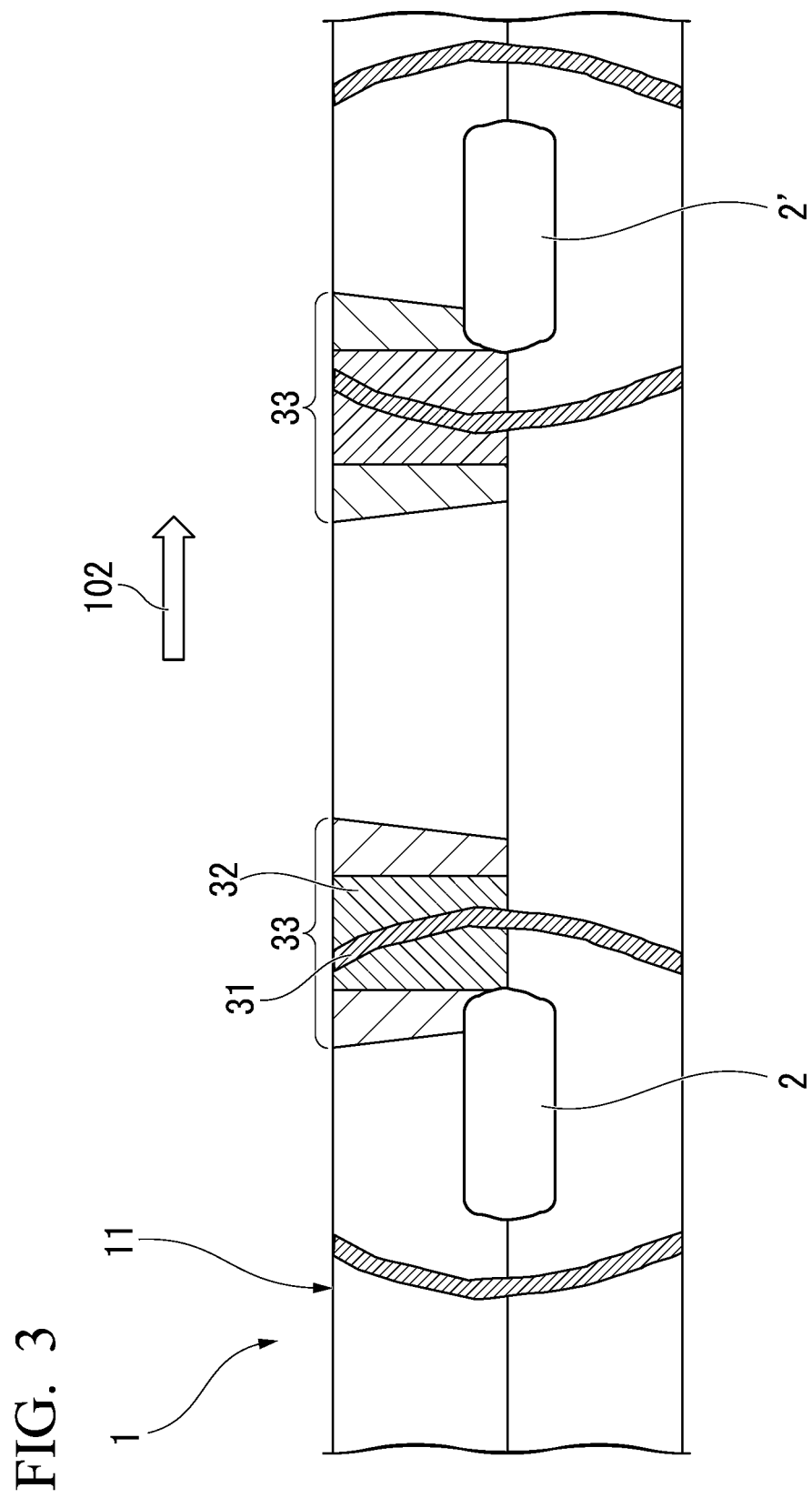
FIG. 3 is a cross-sectional view of the spot welded joint according to the present embodiment in the sheet thickness direction that passes through the nugget center and is an example of a case where another nugget is included in the cross section.

In the event of a collision, in-plane tensile stress is applied in a direction in which a plurality of nuggets is connected to each other. Therefore, in a case where the spot welded joint 1 according to the present embodiment includes the nugget 2 and another nugget, at a time of observing a cross section of the first steel sheet 11 in the sheet thickness direction that passes through the center O of the nugget 2, another nugget 2 is preferably included in the same cross section as shown in FIG. 3. In other words, the hardness control region 33 is preferably provided in at least a direction toward another nugget 2' from the nugget 2 (a direction of an arrow 102 in FIG. 3) in terms of suppressing breaking at the HAZ softened portion 31.

The spot welded joint 1 according to the present embodiment is also applicable to components other than the B pillar. Examples thereof include an A pillar, a side sill, and the like. As described above, the direction in which the nuggets are connected to each other is a potential direction in which tensile stress is generated. However, depending on components to which the spot welded joint is applied and collision states, there is a possibility that tensile stress may be applied in any directions.

The hardness control region 33 is preferably provided in the whole circumferential directions of the sheet surface direction of the nugget 2 because it is possible to suppress breaking in the HAZ softened portion 31 even when tensile stress is applied in any direction in the plane. In other words, the hardness control region 33 is preferably present in all cross sections in the sheet thickness direction that include the center O of the nugget 2.

The maximum value of the hardness in the first region 32 that is included in the hardness control region 33 is preferably 250 HV to 450 HV. Furthermore, it is more preferable that the maximum value of the hardness in the second region 34 is 250 HV to 450 HV. When the maximum value of hardness is less than 250 HV, there is a concern that it may become impossible to obtain a strength high enough for structural members. In addition, when the maximum value exceeds 450 HV, there is a concern that the hardness may exceed the strength of the base metal.

The first steel sheet 11 and/or the second steel sheet 12 may be plated steel sheets. When the first steel sheet 11 and the second steel sheet 12 are plated steel sheets, it is possible to improve the corrosion resistance. As the plated steel sheet, for example, a hot-dip galvanized steel sheet, a galvannealed steel sheet, an electrolytic zinc-plated steel sheet, an aluminized steel sheet, and the like are exemplary examples.

Next, a vehicle framework component according to the present embodiment will be described.

Figure 4:
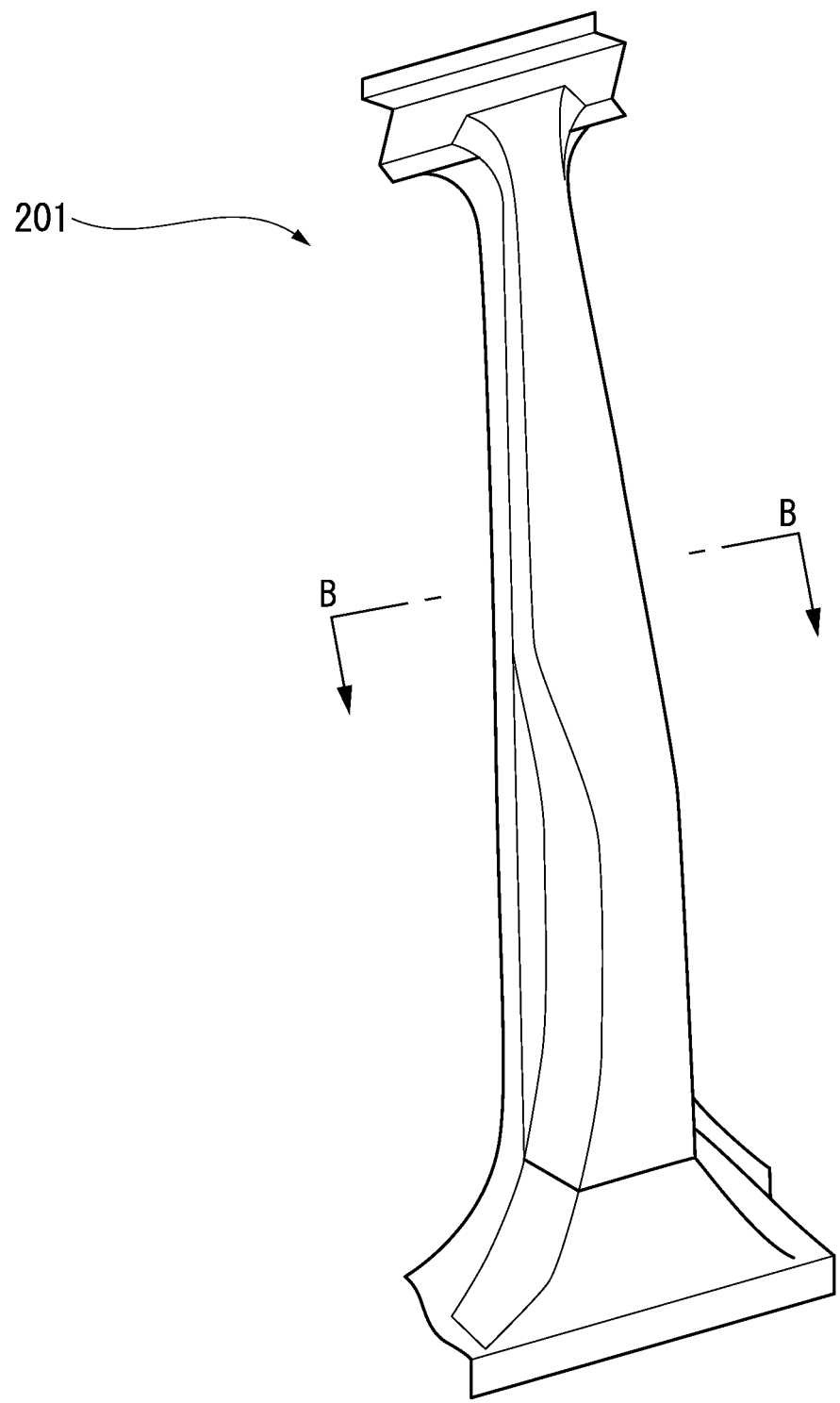
FIG. 4 is a schematic view of a B pillar, which is an example of a vehicle framework component according to the present embodiment.
Figure 5:
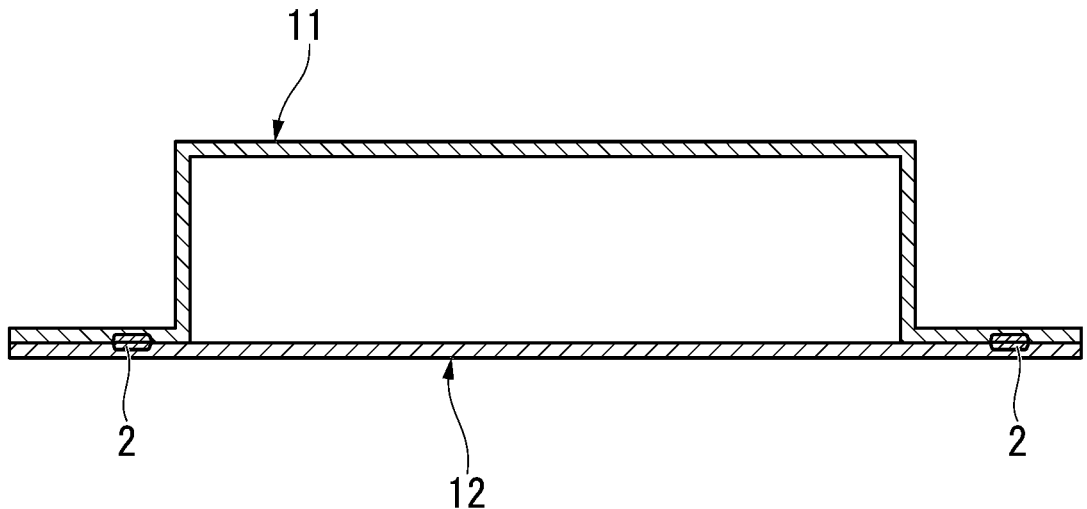
FIG. 5 is a cross-sectional view of the B pillar, which is an example of the vehicle framework component according to the present embodiment, in a direction of B-B.

The vehicle framework component according to the present embodiment is a vehicle framework component including the above-described spot welded joint 1 according to the present embodiment in at least one portion. The vehicle framework component is, for example, a B pillar 201 as shown in FIG. 4 and FIG. 5.

The vehicle framework component according to the present embodiment includes the spot welded joint 1 according to the present embodiment in which breaking in the HAZ softened portion is suppressed. Therefore, in the case of using a high-strength steel sheet, high collision-resistant performance can be obtained.

Next, a manufacturing method of the spot welded joint 1 according to the present embodiment will be described.

The spot welded joint 1 according to the present embodiment can be manufactured by stacking the first steel sheet 11 having a tensile strength of 1100 MPa or higher and having a hard martensitic structure as the main structure and the second steel sheet 12, performing resistance spot welding to form the nugget 2 having a diameter D at the interface between the first steel sheet 11 and the second steel sheet 12 present between the first steel sheet 11 and the second steel sheet 12, and then tempering the first region 32 that is an entire region that is, in a cross section of the first steel sheet 11 in the sheet thickness direction that passes through the center O of the nugget 2, the first steel sheet 11 throughout the entire sheet thickness direction and is from 0.5×D to 1.0×D apart from the center O of the nugget 2 in the sheet surface direction.

In order to temper the first region 32, tempering may be performed on the hardness control region 33 that occupies the first region 32.

Not only the first region 32 but also the second region 34 are preferably tempered in order to obtain a high joint strength. Therefore, the hardness control region 33 is preferably configured to occupy both the first region 32 and the second region 34.

In the manufacturing method of the spot welded joint 1 according to the present embodiment, the hardness control region 33 is provided in at least one direction in which in-plane tensile stress is applied, of the first steel sheet 11 on which resistance spot welding has been performed. That is, the HAZ softened portion 31 present in at least one direction from the center O of the nugget 2 and a peripheral region of the HAZ softened portion 31 are tempered. With such tempering, it is possible to decrease the difference in hardness in the first region 32 including the HAZ softened portion 31. The spot welded joint 1 according to the present embodiment in which breaking from the HAZ softened portion 31 is suppressed can be manufactured in the above-described manner.

The resistance spot welding may be performed under conditions suitable for applications and is not limited.

The tempering conditions are also not particularly limited, but it is preferable to perform tempering at a temperature of 500° C. to 700° C. in order to change hard martensite, which is a quenched structure, to the tempered structure. When the tempering temperature is lower than 500° C., there is a case where it is not possible to sufficiently decrease the difference in hardness. On the other hand, a tempering temperature of higher than 700° C. is also not preferable. This is because a part of the structure transforms into austenite and the austenite turns into a quenched structure again during cooling after tempering. When the austenite turns into a quenched structure again, there is a case where it is not possible to sufficiently decrease the hardness in the first region 32. From the viewpoint of the joint strength, it is preferable to temper the hardness control region 33 that occupies the first region 32 without decreasing the strength of the base material portion. In that case, a method capable of local heating such as a heat treatment using a laser or a heat treatment by energization is preferably used for tempering.

Regarding hardness intended to be obtained by tempering in order to reliably obtain the effect of the invention, the hardness in the first region 32 that is occupied by the hardness control region 33 in at least one direction from the nugget 2 is lower than the maximum value of the hardness of the base material portion of the first steel sheet 11, and the difference between the maximum value of the hardness and the minimum value of the hardness in the first region 32 is 80 HV or less in terms of Vickers hardness. In order to more reliably suppress breaking from the HAZ softened portion 31, the above-described intended hardness is desirably obtained not only in the first region 32 but also in the second region 34.

In addition, the hardness control region 33 is desirably provided in the whole circumferential directions of the nugget 2 in the in-plane direction of the first steel sheet. That is, it is desirable to perform tempering in all cross sections of the first steel sheet in the sheet thickness direction that pass through the center O of the nugget 2 such that the first region 32 satisfies the above-described hardness. This is because, when tempering is performed in the whole circumferential directions of the nugget 2, it is possible to obtain the effect even when in-plane tensile stress is applied in any direction of the first steel sheet. Furthermore, it is desirable to temper the second region 34 as well in order to more reliably suppress breaking from the HAZ softened portion 31.

In addition, when tempering is performed by controlling the conditions such that the maximum value of the hardness in the first region 32 in the hardness control region 33 becomes 250 HV to 450 HV, it is possible to manufacture a welded joint in which breaking from the HAZ softened portion 31 is suppressed while securing a strength high enough for structural members, which is preferable. In order to more reliably suppress breaking from the HAZ softened portion 31, it is desirable that the maximum value of the hardness in the second region 34 is also 250 HV to:450 HV.

Specific tempering conditions for obtaining predetermined hardness can be determined by a method in which, for example, spot welded joints manufactured under similar conditions in advance are tempered under a variety of conditions and a change in hardness is investigated.

EXAMPLES

Hereinafter, the present disclosure will be specifically described using examples with reference to FIG. 6 and Table 1. These examples are merely examples for confirming the effect of the present disclosure and do not limit the present disclosure.

Figure 6:
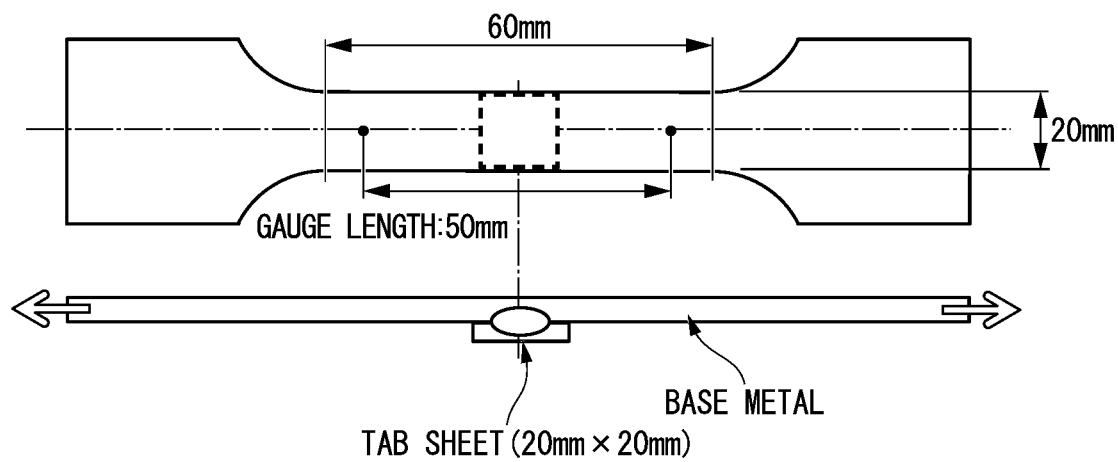
FIG. 6 is a schematic view showing a test piece used in examples.

A tensile test piece having gauge length of 50 mm as shown in FIG. 6 was collected from a steel sheet having a sheet thickness of 1.6 mm that was obtained through a quenching treatment. Three tensile test pieces were collected from the same steel sheet, a tensile test was performed on one of the tensile test pieces as it was according to JIS Z2241:2011 to determine the tensile strength of the steel sheet.

In addition, an etching treatment was performed using a LePera etchant on samples collected from five places in each at a ⅛ thickness position, a ⅜ thickness position, a ⅝ thickness position, and a ⅞ thickness position from the surface in a cross section of the steel sheet in the sheet thickness direction, 100 μm×100 μm visual fields were observed with an optical microscope at a magnification of 1000 times, and the area fractions of martensite were measured in the observed visual fields with an assumption that a structure appearing white to reddish brown was regarded as martensite. The area fractions of martensite in the observed 20 visual fields were averaged, thereby obtaining the area fraction of martensite. After that, an etching treatment was performed on the same samples using picral, 100 μm×100 μm visual fields were observed with the optical microscope at a magnification of 1000 times, and the proportions of hard martensite in martensite were obtained in the observed visual fields. In addition, the proportions of hard martensite in martensite in 20 visual fields were obtained and averaged, and the average value was multiplied by the martensite area fraction, whereby the area fraction of hard martensite was obtained.

For each of the remaining two tensile test pieces, a 20 mm×20 mm tab sheet having a sheet thickness of 1.6 mm was placed at one place in a parallel portion, and resistance spot welding was performed under conditions described below using a single-phase AC spot welder. Due to the resistance spot welding, a nugget having a nugget diameter D of 5×√t (t: the sheet thickness (mm) of the tensile test piece) was formed between the tensile test piece and the tab sheet.

Electrode: DR-type electrode (tip φ: 6 mm, R40)
Welding pressure: 400 kgf
Energization time: 20 cyc After the resistance spot welding, one of the two welded test pieces was tempered by being irradiated with a laser from the first steel sheet side. For joint numbers 1 to 5, tempering was performed on regions including an entire range of 0.5×D to 2.5×D from the nugget center. For joint numbers 6 to 10, tempering was performed on regions including an entire range of 0.5×D to 1.0×D from the nugget center.

For joint numbers 11 to 19, tempering was performed on the nuggets in ranges of 0.5×D to 2.5×D from the center of the nugget in a width of 0.75×D in a direction parallel to the longitudinal direction of the test pieces.

For a joint number 20, a position that was to turn into a hardness control region after welding was tempered in advance before welding using a laser, and then resistance spot welding was performed thereon. After welding, no tempering was performed.

All of the test pieces were cooled to room temperature and then subjected to a tensile test at a tensile speed set to 10 mm/min, and breaking positions and the degree of improvement in fracture elongation were evaluated. The fracture elongation was evaluated based on the percentage of fracture elongation improved relative to a reference that was a test piece that was not tempered before and after welding.

Relative to the material as welded, fracture elongations of 100% to 150% were evaluated as Poor, fracture elongations of 150% to 250% were evaluated as Good, and fracture elongations of 250% or more were evaluated as Excellent. When the fracture elongation was evaluated as Good or better, the test pieces were determined to obtain a sufficient effect.

In addition, the minimum values of the hardness and the maximum values of the hardness were measured in the ranges of 0.5×D to 2.5×D from the centers of the nuggets (joint numbers 1 to 5 and 11 to 20) or in the ranges of 0.5×D to 1.0×D from the centers of the nuggets (joint numbers 6 to 10) in the cross sections of the steel sheets in the sheet thickness direction.

Specifically, hardness was measured from one end portion to the other end portion in the sheet surface direction of the region, which was the object, at intervals of 0.1 mm at a ⅛ thickness position, a ⅜ thickness position, a ⅝ thickness position, and a ⅞ thickness position from the surface of the steel sheet, and the maximum value and the minimum value of the hardness were obtained.

In addition, in order to obtain the maximum value of the hardness of the steel sheet, hardness was measured using a Vickers hardness tester under a load set to 1.0 kgf at a ⅛ thickness position, a ⅜thickness position, a ⅝ thickness position, and a ⅞ thickness position from the surface in 10 places 15 mm to 20 mm apart from one nugget in a direction opposite to another nugget.

The results are shown in Table 1.

In the joint numbers 1 to 5 and 17 to 19 (invention examples), the differences between the maximum value and the minimum value of the Vickers hardness in the tempered portions (the ranges of 0.5×D to 2.5×D from the centers of the nuggets) were 80 HV or less, and the maximum values of the Vickers hardness in these regions were lower than the maximum values of the Vickers hardness of the base material portions. As a result, the breaking positions were not the HAZ softened portions, and the fracture elongations were 250% or more relative to a case where tempering was not performed.

In the joint numbers 6 to 10 (invention examples), the differences between the maximum value and the minimum value of the Vickers hardness in the tempered portions (the ranges of 0.5×D to 1.5×D from the centers of the nuggets) were 80 HV or less, and the maximum values of the Vickers hardness in these regions were lower than the maximum values of the Vickers hardness of the base material portions. As a result, breaking occurred in the tempered portions in the peripheries of the nuggets, but the fracture elongations improved to 150% or more relative to a case where tempering was not performed.

On the other hand, in the joint numbers 11 to 16 and 20 (comparative examples), the differences between the maximum value and the minimum value of the Vickers hardness in the tempered portions were 80 HV or more or the maximum values of the Vickers hardness in these regions were higher than the maximum values of the Vickers hardness of the base material portions. The reason therefor is considered as the lack of heating during tempering. In addition, regarding the joint number 20, it is considered that the HAZ softened portion generated by welding affected breaking.

predetermined collision-resistant performance. In addition, according to the manufacturing method of a spot welded joint of the present disclosure, it is possible to manufacture a spot welded joint capable of obtaining predetermined collision-resistant performance in the case of using the spot welded joint as a structural member configuring a vehicle body of a vehicle.

Therefore, the present disclosure is highly industrially applicable.

TABLE 1

| Joint No. | Tensile strength (MPa) | Tensile test place (first steel sheet) Area fraction of hard martensite (%) | Maximum value of hardness (HV) | Tempered portion Range (Distance from center of nugget) | Average hardness (HV) | Maximum value of hardness (HV) | Minimum value of hardness (HV) | Difference between maximum value and minimum value of hardness (HV) | Breaking position | Fracture elongation | Note |
|---|---|---|---|---|---|---|---|---|---|---|---|
| 1 | 1150 | 51 | 399 | 0.5 × D TO 2.5 × D | 303 | 341 | 281 | 60 | Base metal | Excellent | Invention Example |
| 2 | 1290 | 70 | 421 | 0.5 × D TO 2.5 × D | 322 | 353 | 290 | 63 | Base metal | Excellent | Invention Example |
| 3 | 1480 | 80 | 466 | 0.5 × D TO 2.5 × D | 333 | 375 | 306 | 69 | Base metal | Excellent | Invention Example |
| 4 | 1780 | 85 | 565 | 0.5 × D TO 2.5 × D | 385 | 425 | 353 | 72 | Base metal | Excellent | Invention Example |
| 5 | 2010 | 90 | 610 | 0.5 × D TO 2.5 × D | 393 | 433 | 366 | 67 | Base metal | Excellent | Invention Example |
| 6 | 1150 | 51 | 399 | 0.5 × D TO 1.0 × D | 303 | 341 | 281 | 60 | Periphery of nugget | Good | Invention Example |
| 7 | 1290 | 70 | 421 | 0.5 × D TO 1.0 × D | 322 | 353 | 290 | 63 | Periphery of nugget | Good | Invention Example |
| 8 | 1480 | 80 | 466 | 0.5 × D TO 1.0 × D | 333 | 375 | 306 | 69 | Periphery of nugget | Good | Invention Example |
| 9 | 1780 | 85 | 565 | 0.5 × D TO 1.0 × D | 385 | 425 | 353 | 72 | Periphery of nugget | Good | Invention Example |
| 10 | 2010 | 90 | 610 | 0.5 × D TO 1.0 × D | 393 | 433 | 366 | 67 | Periphery of nugget | Good | Invention Example |
| 11 | 1150 | 51 | 399 | 0.5 × D TO 2.5 × D | 360 | 385 | 281 | 104 | HAZ softened portion | poor | Comparative Example |
| 12 | 1290 | 70 | 421 | 0.5 × D TO 2.5 × D | 365 | 395 | 290 | 105 | HAZ softened portion | poor | Comparative Example |
| 13 | 1480 | 80 | 466 | 0.5 × D TO 2.5 × D | 430 | 454 | 306 | 148 | HAZ softened portion | poor | Comparative Example |
| 14 | 1480 | 80 | 466 | 0.5 × D TO 2.5 × D | 380 | 480 | 353 | 127 | HAZ softened portion | poor | Comparative Example |
| 15 | 1780 | 85 | 565 | 0.5 × D TO 2.5 × D | 420 | 460 | 353 | 107 | HAZ softened portion | poor | Comparative Example |
| 16 | 2010 | 90 | 610 | 0.5 × D TO 2.5 × D | 426 | 480 | 366 | 114 | HAZ softened portion | poor | Comparative Example |
| 17 | 1480 | 80 | 466 | 0.5 × D TO 2.5 × D | 333 | 375 | 306 | 69 | Base metal | Excellent | Invention Example |
| 18 | 1780 | 85 | 565 | 0.5 × D TO 2.5 × D | 385 | 425 | 353 | 72 | Base metal | Excellent | Invention Example |
| 19 | 2010 | 90 | 610 | 0.5 × D TO 2.5 × D | 393 | 433 | 366 | 67 | Base metal | Excellent | Invention Example |
| 20 | 1780 | 85 | 466 | 0.5 × D TO 2.5 × D | 400 | 520 | 353 | 167 | Periphery of nugget | poor | Comparative Example |

INDUSTRIAL APPLICABILITY

According to the spot welded joint of the present disclosure, since it is possible to suppress breaking from the HAZ softened portion in the peripheral region of the nugget even in a case where in-plane tensile stress is applied, it is possible to obtain predetermined collision-resistant performance in the case of using the spot welded joint as a structural member configuring a vehicle body of a vehicle. In addition, in the vehicle framework component of the present disclosure, since it is possible to suppress breaking from the HAZ softened portion, it is possible to obtain

BRIEF DESCRIPTION OF THE REFERENCE SYMBOLS

1 Spot welded joint
2 Nugget
2' Nugget (another nugget)
O Center of nugget
11 First steel sheet
12 Second steel sheet
31 HAZ softened portion
32 First region
33 Hardness control region 34 Second region
102 Sheet surface direction
201 B pillar

What is claimed is:

1. A spot welded joint comprising:
a first steel sheet having a tensile strength of 1100 MPa or higher and having a hard martensitic structure as a main structure;
a second steel sheet stacked on the first steel sheet;
a nugget having a diameter D at an interface between the first steel sheet and the second steel sheet and formed between the first steel sheet and the second steel sheet; and
a hardness control region that occupies, in a cross section of the first steel sheet in a sheet thickness direction that passes through a center of the nugget, a region that is the entire first steel sheet in the sheet thickness direction and is from 0.5×D to 1.0×D apart from the center of the nugget in a sheet surface direction and in which a difference between a maximum value of hardness and a minimum value of the hardness in the region is 80 HV or less, and the maximum value of the hardness in the region is lower than a maximum value of hardness of the first steel sheet.

2. The spot welded joint according to claim 1, further comprising:
another nugget in the cross section.

3. The spot welded joint according to claim 1,
wherein the hardness control region is present in all of the cross section.

4. The spot welded joint according to claim 1,
wherein the maximum value of the hardness in the region is 250 HV to 450 HV.

5. The spot welded joint according to claim 1,
wherein the first steel sheet and the second steel sheet are plated steel sheets.

6. A vehicle framework component comprising:
the spot welded joint according to claim 1.

7. A manufacturing method of a spot welded joint comprising:
stacking a first steel sheet having a tensile strength of 1100 MPa or higher and having a hard martensitic structure as a main structure and a second steel sheet and performing resistance spot welding to form a nugget between the first steel sheet and the second steel sheet, the nugget having a diameter D at an interface between the first steel sheet and the second steel sheet present, and
tempering an entire region that is, in a cross section of the first steel sheet in a sheet thickness direction that passes through a center of the nugget, the entire first steel sheet in the sheet thickness direction and is from 0.5×D to 1.0×D apart from the center of the nugget in a sheet surface direction.

8. The manufacturing method of a spot welded joint according to claim 7,
wherein a tempering is performed such that a difference between a maximum value of hardness and a minimum value of the hardness in the region becomes 80 HV or less and the maximum value of the hardness in the region becomes lower than a maximum value of hardness of the first steel sheet.

9. The manufacturing method of a spot welded joint according to claim 8,
wherein the maximum value of the hardness in the region is 250 HV to 450 HV.

10. The manufacturing method of a spot welded joint according to claim 7,
wherein the tempering is performed on the region of all of the cross section.

* * * * *